(12) United States Patent
Zhu et al.

(10) Patent No.: US 11,705,838 B2
(45) Date of Patent: Jul. 18, 2023

(54) VIBRATION COMPENSATION CONTROLLER WITH NEURAL NETWORK BAND-PASS FILTERS FOR BEARINGLESS PERMANENT MAGNET SYNCHRONOUS MOTOR

(71) Applicant: Jiangsu University, Jiangsu (CN)

(72) Inventors: Huangqiu Zhu, Jiangsu (CN); Xin Wang, Jiangsu (CN)

(73) Assignee: Jiangsu University, Jiangsu (CN)

( * ) Notice: Subject to any disclaimer, the term of this patent is extended or adjusted under 35 U.S.C. 154(b) by 40 days.

(21) Appl. No.: 17/625,777

(22) PCT Filed: Mar. 23, 2021

(86) PCT No.: PCT/CN2021/082326
§ 371 (c)(1),
(2) Date: Jan. 10, 2022

(87) PCT Pub. No.: WO2022/174488
PCT Pub. Date: Aug. 25, 2022

(65) Prior Publication Data
US 2023/0008153 A1      Jan. 12, 2023

(30) Foreign Application Priority Data
Feb. 22, 2021   (CN) .......................... 202110195977.3

(51) Int. Cl.
*H02P 21/00* (2016.01)
*H02P 21/18* (2016.01)
*H02P 27/08* (2006.01)

(52) U.S. Cl.
CPC .......... *H02P 21/0014* (2013.01); *H02P 21/18* (2016.02); *H02P 27/085* (2013.01)

(58) Field of Classification Search
CPC .... H02P 21/0014; H02P 21/18; H02P 27/085; H02P 21/05; G05B 19/00
See application file for complete search history.

(56) References Cited

U.S. PATENT DOCUMENTS

2009/0116136 A1* 5/2009 Zhang ................... G11B 5/596
                                                                      360/75

FOREIGN PATENT DOCUMENTS

| CN | 103684179 | 3/2014 |
|---|---|---|
| CN | 104579042 | 4/2015 |

(Continued)

OTHER PUBLICATIONS

"International Search Report (Form PCT/ISA/210) of PCT/CN2021/082326," dated Nov. 24, 2021, pp. 1-5.

*Primary Examiner* — Karen Masih
(74) *Attorney, Agent, or Firm* — JCIPRNET

(57) ABSTRACT

The controller comprises a displacement controller and a rotating speed controller. The displacement controller includes a vibration force compensation control module and a dead-time vibration compensation module. The vibration force compensation control module receives actual displacements and a rotor mechanical angle and outputs corresponding vibration compensation forces. The vibration force compensation control module comprises a first neural network band-pass filter, a second neural network band-pass filter, a third PID controller, and a fourth PID controller. The dead-time vibration compensation module receives a rotor electrical angle and an actual quadrature-direct axis currents and an actual direct axis current and outputs a quadrature-direct axis compensation voltages and a direct axis compensation voltage. The dead-time vibration compensation module consists of a third neural network band-pass filter in a direct axis direction, a fourth neural network band-pass filter in a (Continued)

quadrature axis direction, a sixth PI controller, and a seventh PI controller.

10 Claims, 7 Drawing Sheets

(56) References Cited

FOREIGN PATENT DOCUMENTS

| | | |
|---|---|---|
| CN | 104659990 | 5/2015 |
| CN | 105048913 | 11/2015 |
| CN | 110380658 | 10/2019 |
| CN | 111245318 | 6/2020 |
| JP | 2005229717 | 8/2005 |
| JP | 5488043 | 5/2014 |

* cited by examiner

VIBRATION COMPENSATION CONTROLLER WITH NEURAL NETWORK BAND-PASS FILTERS FOR BEARINGLESS PERMANENT MAGNET SYNCHRONOUS MOTOR

CROSS-REFERENCE TO RELATED APPLICATION

This application is a 371 of international application of PCT application serial no. PCT/CN2021/082326, filed on Mar. 23, 2021, which claims the priority benefit of China application no. 202110195977.3, filed on Feb. 22, 2021. The entirety of each of the above mentioned patent applications is hereby incorporated by reference herein and made a part of this specification.

TECHNICAL FIELD

The present invention relates to the field of control of a bearingless motor, and in particular, to compensation control for vibration of a bearingless permanent magnet synchronous motor by using dead-time compensation control and rotor eccentricity control technologies for the bearingless permanent magnet synchronous motor.

BACKGROUND

Bearingless permanent magnet synchronous motors are a new type of special motors that have high speed and high precision and require no lubrication. Their application prospects in aerospace, chemical manufacturing, semiconductor industry, and other fields in need of special environments increasingly grow. The bearingless permanent magnet synchronous motor is used as a rotary drive motor. Due to problems such as material unevenness, processing errors, and assembly errors, a certain degree of rotor mass eccentricity inevitably exists and a centrifugal excitation force at the same frequency as a rotation speed is produced when the motor is in rotation. Meanwhile, in a control process of the bearingless permanent magnet synchronous motor, a dead time must be set to avoid a short circuit between upper and lower bridge arms of an inverter. The introduction of the dead time causes an increase in current harmonics, and the amplitude of an unbalanced force is further increased, which results in unbalanced vibration of a rotor and affects suspension control precision of the rotor.

Regarding control for unbalanced vibration of the rotor in the bearingless permanent magnet synchronous motor, compensation control is mainly performed against unbalanced vibration caused by rotor mass eccentricity in the prior art, while unbalanced vibration caused by a dead-time effect is rarely concerned. Chinese Patent Publication No. CN104659990A discloses a method for extracting an unbalanced vibration displacement of a bearingless motor through adaptive filtering, which paves the way for the primary condition of vibration compensation control of a bearingless motor. Chinese Patent Publication No. CN105048913A discloses a current compensation-based unbalanced vibration control system for a bearingless asynchronous motor, wherein compensation control for suspension vibration is realized by adjusting a compensation current. However, in these solutions, the vibration compensation control of the bearingless motor mainly focuses on detection and compensation for vibration caused by eccentricity and does not concern vibration caused by the dead-time effect. To improve the control precision of the unbalanced vibration displacement of the bearingless permanent magnet synchronous motor, compensation not only needs to be made for a rotor eccentricity displacement caused by rotor mass eccentricity, but also needs to be made for unbalanced vibration of the rotor caused by the dead-time effect, which is critical to the implementation of high-precision control of the bearingless permanent magnet synchronous motor.

SUMMARY

An objective of the present invention is to provide a vibration compensation controller with neural network band-pass filters for a bearingless permanent magnet synchronous motor. The controller performs vibration compensation to suppress vibration of the bearingless permanent magnet synchronous motor, thereby solving the problem in the prior art that compensation is only made for vibration caused by rotor mass eccentricity and vibration caused by a dead-time effect is ignored in the vibration compensation control of the bearingless permanent magnet synchronous motor. Therefore, stable suspension and efficient operation of a rotor of the motor are realized, the control precision of the motor is improved, and better application in an electric drive system is achieved.

The vibration compensation controller with neural network band-pass filters for a bearingless permanent magnet synchronous motor provided by the present invention adopts the following technical solution. The controller comprises a displacement controller and a rotating speed controller. The displacement controller includes a vibration force compensation control module and a dead-time vibration compensation module.

The vibration force compensation control module receives, as input, actual displacements x, y in x and y directions and a rotor mechanical angle $\theta_m$ and outputs corresponding vibration compensation forces $F_{xh}$ and $F_{yh}$. The vibration force compensation control module comprises a first neural network band-pass filter, a second neural network band-pass filter, a third proportional-integral-derivative (PID) controller, and a fourth PID controller. The first neural network band-pass filter receives, as input, the actual displacement x in the x direction and the rotor mechanical angle $\theta_m$ and outputs a vibration displacement $\hat{x}$. A difference between a specified value 0 and the vibration displacement $\hat{x}$ is input to the third PID controller, and the third PID controller outputs the vibration compensation force $F_{xh}$. The second neural network band-pass filter receives, as input, the actual displacement y in the y direction and the rotor mechanical angle $\theta_m$ and outputs a vibration displacement $\hat{y}$. A difference between the specified value 0 and the vibration displacement $\hat{y}$ is input to the fourth PID controller, and the fourth PID controller outputs the vibration compensation force $F_{yh}$. A sum of the vibration compensation force $F_{xh}$ and a specified force value $F_x$ of a suspension winding in the x direction is input to a force/current conversion module, a sum of the vibration compensation force $F_{yh}$ and a specified force value $F_y$ of the suspension winding in the y direction is input to the force/current conversion module, and the current conversion module obtains a specified quadrature axis current value $i^*_{Bq}$ and a specified direct axis current value $i^*_{Bd}$.

The dead-time vibration compensation module receives, as input, a rotor electrical angle $\theta_e$, and an actual quadrature axis current $i_{Bq}$, and an actual direct axis current $i_{Bd}$ and outputs a quadrature axis compensation voltage $u_{Bqh}$ and a direct axis compensation voltage $u_{Bdh}$. The dead-time vibration compensation module comprises a third neural network band-pass filter in a direct axis direction, a fourth neural network band-pass filter in a quadrature axis direction, a sixth proportional-integral (PI) controller, and a seventh PI controller. The third neural network band-pass filter receives, as input, the actual current $i_{Bd}$ in the direct axis direction and 6 times of the rotor electrical angle $\theta_e$ and obtains a harmonic current $\hat{i}_{Bd}$ in the direct axis direction. A difference between the specified value 0 and the harmonic current $\hat{i}_{Bd}$ is input to the sixth PI controller, and the sixth PI controller obtains the direct axis compensation voltage $u_{Bdh}$. A sum of a control voltage $u_{Bd}$ in the direct axis direction and the direct axis compensation voltage $u_{Bdh}$ serves as a direct axis command voltage $u^*_{Bd}$. The fourth neural network band-pass filter receives, as input, the actual current $i_{Bq}$ in the quadrature axis direction and 6 times of the rotor electrical angle $\theta_e$ and obtains a harmonic current $\hat{i}_{Bq}$ in the direct axis direction. A difference between the specified value 0 and the harmonic current $\hat{i}_{Bq}$ is input to the seventh PI controller, and the seventh PI controller obtains the quadrature axis compensation voltage $u_{Bqh}$. A sum of a control voltage $u_{Bq}$ in the quadrature axis direction and the quadrature axis compensation voltage $u_{Bqh}$ serves as a quadrature axis command voltage $u^*_{Bq}$.

The present invention has the following beneficial effects:

1) By adopting dead-time vibration compensation control, the present invention not only compensates for the dead time, but also effectively suppresses vibration during the operation of the bearingless permanent magnet synchronous motor, thereby improving the suspension control precision.

2) The neural network band-pass filters adopted by the present invention have simple working principles and concise calculation processes and can obtain required signals according to real-time speeds of the motor.

3) The present invention adopts the PI controllers to regulate vibration. The controllers have simple principles, their coefficients can be adjusted conveniently, and they have strong robustness.

4) In the vibration compensation control of the bearingless permanent magnet synchronous motor, generally only the vibration caused by eccentricity is considered and compensation control is implemented, while the vibration caused by the dead-time effect is not concerned, which affects the entire suspension control precision. To achieve higher suspension control precision of the bearingless permanent magnet synchronous motor, the present invention not only performs analysis and compensation for vibration caused by eccentricity, but also performs compensation control for vibration caused by the dead-time effect, thereby effectively improving the suspension control precision.

BRIEF DESCRIPTION OF THE DRAWINGS

In order to make the content of the present invention more obvious and understandable, the present invention will be described in detail below with reference to the accompanying drawings and specific embodiments.

DESCRIPTION OF THE EMBODIMENTS

The specific ideas and implementation steps of the present invention are illustrated below.

Figure 1:
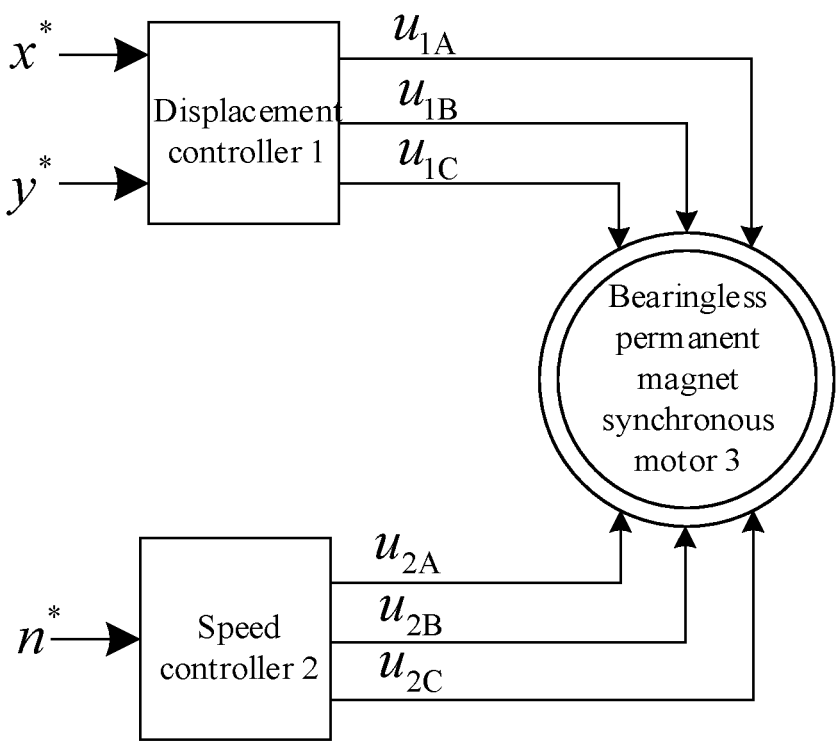
FIG. 1 is a schematic block diagram of the structure of the present invention.

Referring to FIG. 1, the vibration compensation controller with neural network band-pass filters for a bearingless permanent magnet synchronous motor of the present invention comprises a displacement controller 1 and a rotating speed controller 2. Output ends of the displacement controller 1 and the rotating speed controller 2 are connected to a bearingless permanent magnet synchronous motor 3, so as to control the bearingless permanent magnet synchronous motor 3.

Figure 2:
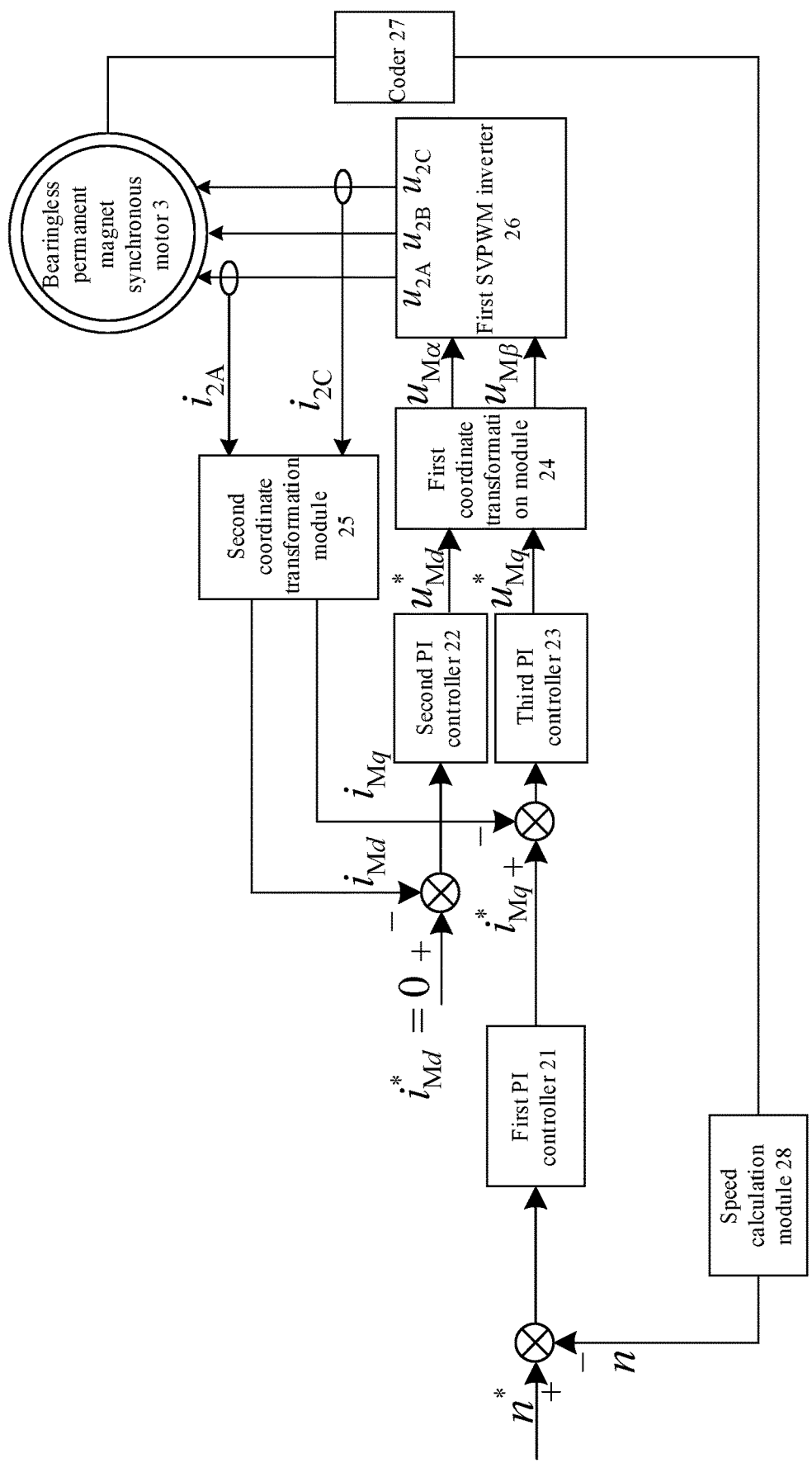
FIG. 2 is a schematic block diagram of the structure of a rotating speed controller 2 in FIG. 1.

As shown in FIG. 2, the rotating speed controller 2 adopts double closed-loop control of speed and current, and comprises a first PI controller 21, a second PI controller 22, a third PI controller 23, a first coordinate transformation module 24, a second coordinate transformation module 25, a first SVPWM inverter 26, a coder 27, and a speed calculation module 28. An output end of the coder 27 is connected to the speed calculation module 28. The coder 27 collects speed pulse signals from a rotating shaft of the bearingless permanent magnet synchronous motor 3, performs an accumulate operation, and inputs an accumulation result $\Delta P$ into the speed calculation module 28. The speed calculation module 28 calculates an actual rotor speed n of the motor, and the speed n is calculated by the following formula:

$$n = \frac{60\Delta P}{T_s L_e} \quad (1)$$

wherein $T_s$ is an interrupt cycle of the rotating speed controller 2 and $L_e$ is the number of lines of the coder.

A difference between the calculated actual speed n and a specified speed value n* serves as a speed error, and the error is input to the first PI controller 21. The first PI controller 21 makes adjustment to obtain a specified quadrature axis current value $i^*_{Mq}$ of a torque winding. Meanwhile, a current sensor collects torque currents $i_{2A}$ and $i_{2C}$ of the two-phase torque winding of the bearingless permanent magnet synchronous motor 3, and inputs the torque currents $i_{2A}$ and $i_{2C}$ to the second coordinate transformation module 25. The second coordinate transformation module 25 is configured for performing Clarke transform and Park transform. The second coordinate transformation module 25 transforms $i_{2A}$ and $i_{2C}$ into an actual quadrature axis current value $i_{Mq}$ of the torque winding and an actual direct axis current value $i_{Md}$ of the torque winding in a rotating reference frame. An error between the specified quadrature axis current value $i^*_{Mq}$ the torque winding and the actual quadrature axis current value $i_{Mq}$ of the torque winding is input to the second PI controller 22 to obtain a specified quadrature axis voltage value $u^*_{Mq}$ of the torque winding. When a specified direct axis current value of the torque winding is $i^*_{Md}=0$, an error between $i^*_{Md}$ and the actual direct axis current value $i_{Md}$ of the torque winding is input to the third PI controller 23 to obtain a specified direct axis voltage value $u^*_{Md}$ of the torque winding. Output ends of the second PI controller 22 and the third PI controller 23 are both connected to an input end of the first coordinate transformation module 24. The first coordinate transformation module 24 is configured for performing inverse Park transform, through which the specified quadrature axis voltage value $u^*_{Mq}$ of the torque winding and the specified direct axis voltage value $u^*_{Md}$ of the torque winding can be transformed into voltages $u_{M\alpha}$ and $u_{M\beta}$ of the torque winding in a stationary reference frame. An output end of the first coordinate transformation module 24 is sequentially connected in series with the first SVPWM inverter 26 and the bearingless permanent magnet synchronous motor 3. The first coordinate transformation module 24 inputs the voltages $u_{M\alpha}$ and $u_{M\beta}$ to the first SVPWM inverter 26. An output of the first SVPWM inverter 26 is connected to an input of the bearingless permanent magnet synchronous motor 3. The first SVPWM inverter 26 obtains three-phase input voltages $u_{2A}$, $u_{2B}$, and $u_{2C}$ of the bearingless permanent magnet synchronous motor 3.

Figure 3:
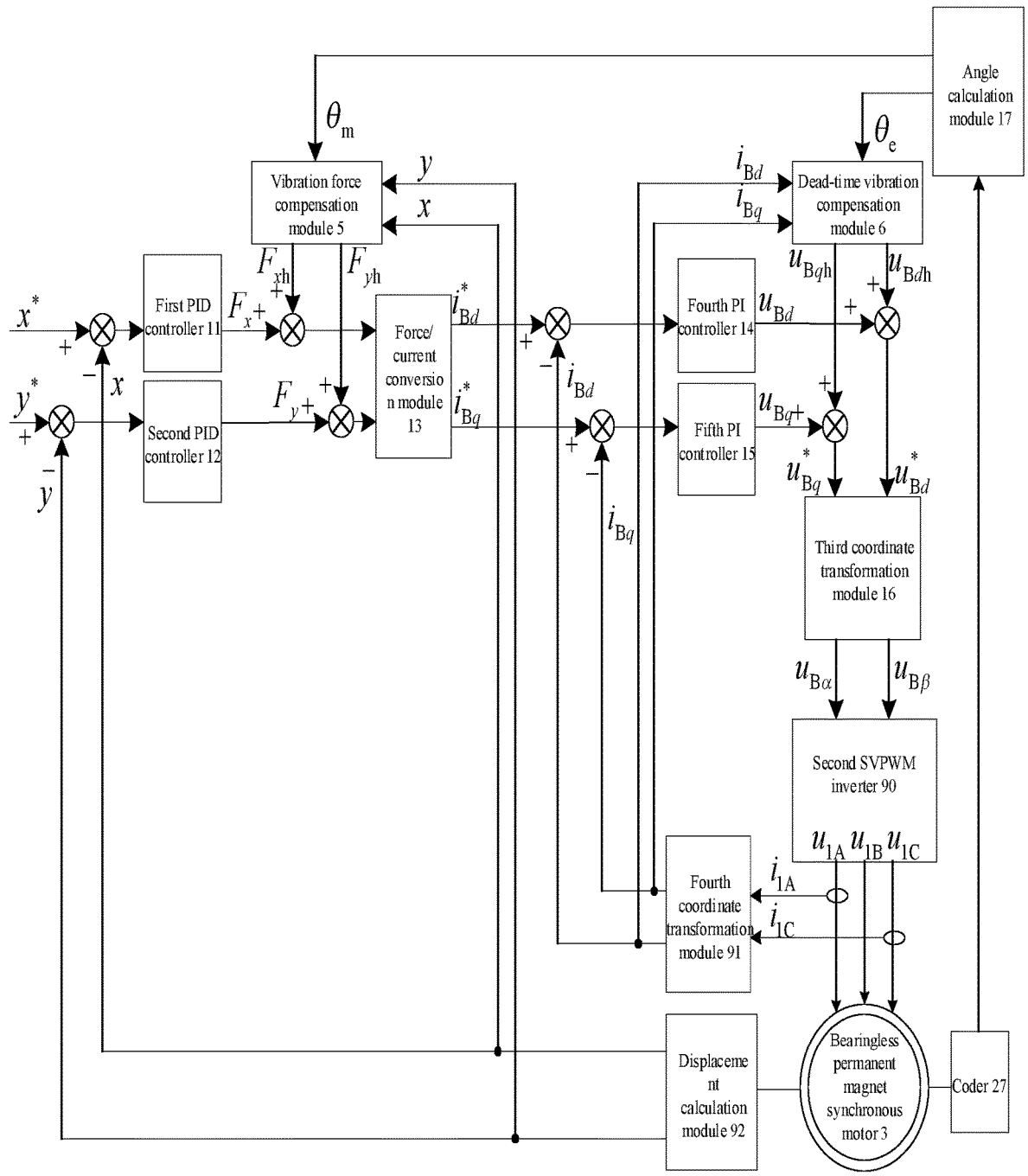
FIG. 3 is a schematic block diagram of the structure of a displacement controller 1 in FIG. 1.

As shown in FIG. 3, the displacement controller 1 adopts double closed-loop control of displacement and current, and comprises a first PID controller 11, a second PID controller 12, a vibration force compensation module 5, a force/current conversion module 13, a fourth PI controller 14, a fifth PI controller 15, a dead-time vibration compensation module 6, a third coordinate transformation module 16, an angle calculation module 17, a second SVPWM inverter 90, a fourth coordinate transformation module 91, a displacement calculation module 92, and the coder 27. A displacement sensor collects and inputs a rotor position of the bearingless permanent magnet synchronous motor 3 to the displacement calculation module 92. The displacement calculation module 92 converts a collected displacement signal into actual displacements in x and y directions, obtains a displacement error as a difference between the actual displacement x in the x direction and a specified value x* and inputs the error to the first PID controller 11. The first PID controller 11 makes adjustment to obtain a specified force value $F_x$ of a suspension winding in the x direction. The displacement calculation module 92 obtains a displacement error as a difference between the actual displacement y in the y direction and a specified value y* and inputs the error to the second PID controller 82. The second PID controller 12 makes adjustment to obtain a specified force value $F_y$ of the suspension winding in the y direction.

The output end of the coder 27 is further connected to the angle calculation module 17. A pulse signal output by the coder 27 is input to the angle calculation module 17 to obtain a rotor mechanical angle $\theta_m$. The rotor mechanical angle at a moment k is calculated as follows:

$$\theta_m(k) = \theta_m(k-1) + \frac{60\Delta P}{9.55 L_e} \quad (2)$$

wherein $\Delta P$ is the accumulation result of pulses output by the coder 27.

Output ends of the angle calculation module 17 and the displacement calculation module 92 are both connected to an input end of the vibration force compensation control module 5. The rotor mechanical angle $\theta_m$ output by the angle calculation module 17 and the actual rotor displacements x, y output by the displacement calculation module 92 are input to the vibration force compensation control module 5 to obtain compensation forces $F_{xh}$ and $F_{yh}$.

Figure 4:
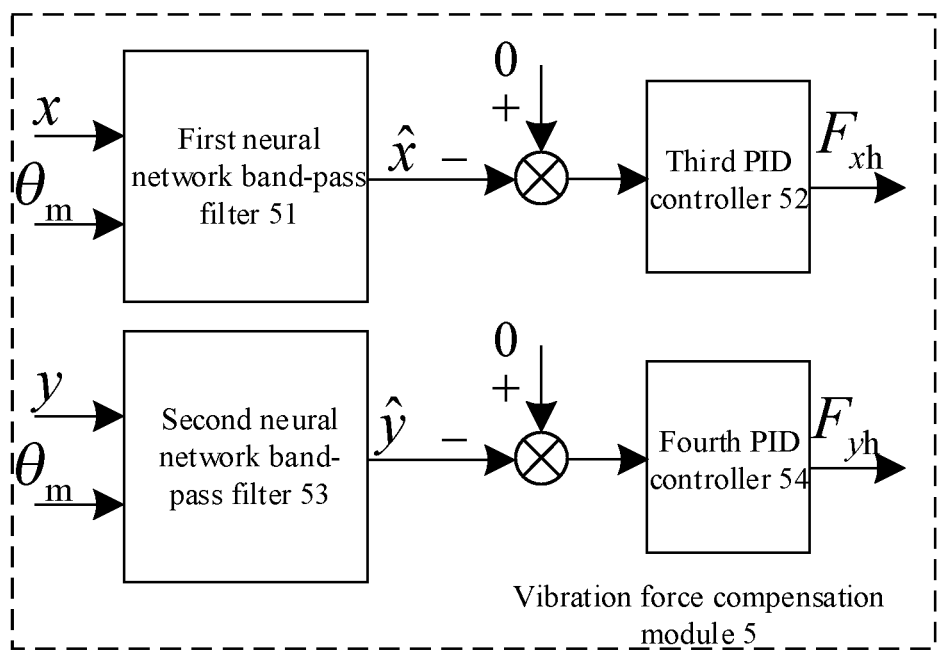
FIG. 4 is a schematic block diagram of a vibration force compensation module 5 in x and y directions in FIG. 3.
Figure 6:
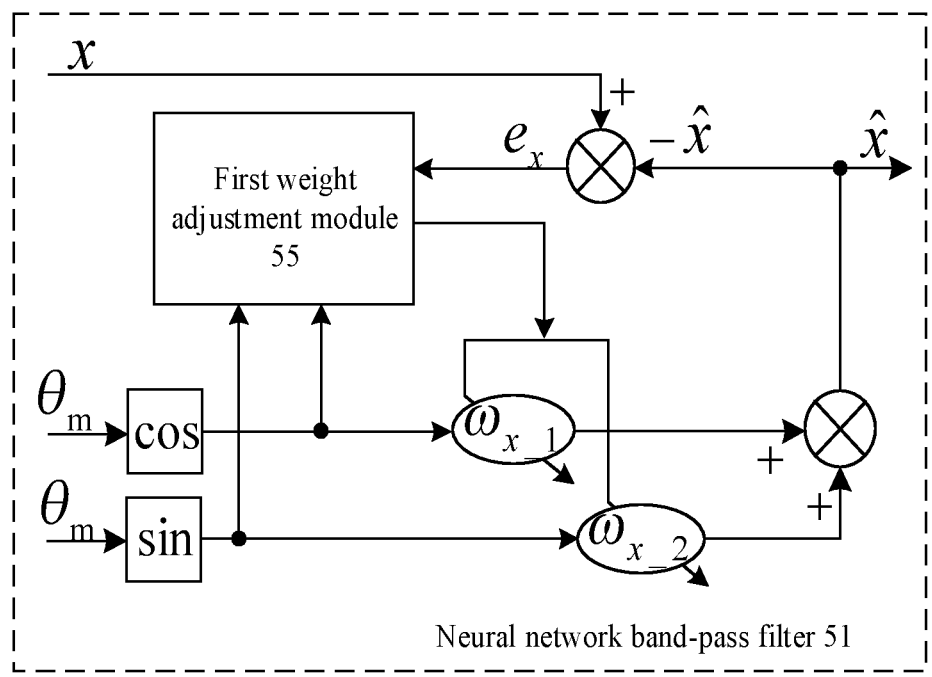
FIG. 6 is a schematic block diagram of the internal structure of a first neural network band-pass filter 51 in FIG. 4.

As shown in FIG. 4, the vibration force compensation control module 5 comprises a first neural network band-pass filter 51, a second neural network band-pass filter 53, a third PID controller 52, and a fourth PID controller 54. The first neural network band-pass filter 51 receives the displacement in the x direction and the rotor mechanical angle $\theta_m$ and outputs a vibration displacement signal $\hat{x}$. FIG. 6 shows the specific structure of the first neural network band-pass filter 51 in the x direction, which includes a first weight adjustment module 5. A difference between the actual displacement x and the vibration displacement $\hat{x}$ output by the first neural network band-pass filter 51 serves as an error signal $e_x$. The error signal $e_x$ and sine and cosine values of the rotor mechanical angle $\theta_m$ are input to the first weight adjustment module 55 to obtain updated weights $\omega_{x\_1}$ and $\omega_{x\_2}$ in the x direction. The vibration displacement $\hat{x}$ output by the first neural network band-pass filter 51 at the moment k is calculated by the following formula:

$$\hat{x}(k)=\omega_{x\_1}(k)\cdot\cos\theta_m(k)+\omega_{x\_2}(k)\cdot\sin\theta_m(k) \quad (3).$$

The weights $\omega_{x\_1}$ and $\omega_{x\_2}$ are calculated by the following formulas:

$$\begin{cases} \omega_{x\_1}(k+1) = \omega_{x\_1}(k) + 2\mu_1 e_x \cos\theta_m \\ \omega_{x\_2}(k+1) = \omega_{x\_2}(k) + 2\mu_1 e_x \sin\theta_m \end{cases} \quad (4)$$

wherein $e_x$ is a component in the x direction after harmonics are filtered out; $\omega_{x\_1}$ and $\omega_{x\_2}$ are updated weights in the x direction; $\mu_1$ is a step factor.

Therefore, the vibration displacement $\hat{x}$ in the x direction is obtained. As shown in FIG. 4, a displacement difference between a specified value 0 and the vibration displacement $\hat{x}$ is input to the third PID controller 52, and the third PID controller 52 makes adjustment to obtain the vibration compensation force $F_{xh}$.

Figure 7:
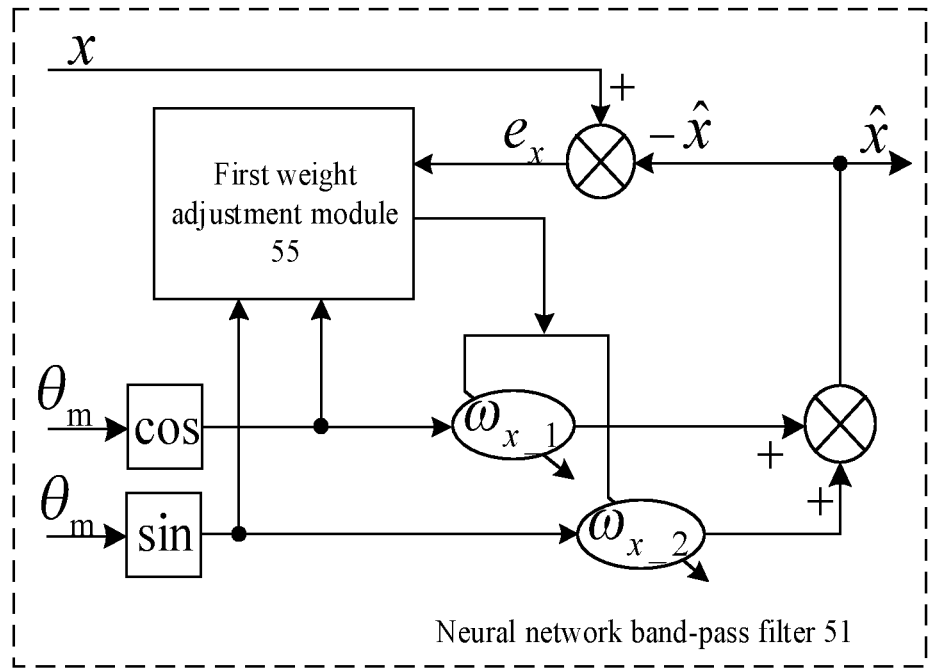
FIG. 7 is a schematic block diagram of the internal structure of a second neural network band-pass filter 53 in FIG. 5.

The second neural network band-pass filter 53 is identical to the first neural network band-pass filter 51 in structure and principle. Likewise, the displacement in the y direction and the rotor mechanical angle $\theta_m$ are input to the second neural network band-pass filter 53. FIG. 7 shows the specific structure of the second neural network band-pass filter 53 in the y direction. A difference between the actual displacement y and a vibration displacement $\hat{y}$ output by the second neural network band-pass filter 53 serves as an error signal $e_y$. The error signal $e_y$ and the sine and cosine values of the rotor mechanical angle $\theta_m$ are input to a second weight adjustment module 56 to obtain updated weights $\omega_{y\_1}$ and $\omega_{y\_2}$ in the y direction. The vibration displacement signal $\hat{y}$ output by the second neural network band-pass filter 53 at the moment k is calculated by the following formula:

$$\hat{y}(k)=\omega_{y\_1}(k)\cdot\cos\theta_m(k)+\omega_{y\_2}(k)\cdot\sin\theta_m(k) \quad (5).$$

The weights $\omega_{y\_1}$ and $\omega_{y\_2}$ are calculated by the following formulas:

$$\begin{cases} \omega_{y\_1}(k+1) = \omega_{y\_1}(k) + 2\mu_1 e_y \cos\theta_m \\ \omega_{y\_2}(k+1) = \omega_{y\_2}(k) + 2\mu_1 e_y \sin\theta_m \end{cases} \quad (6)$$

wherein $e_y$ is a component in the y direction after harmonics are filtered out; $\omega_{y\_1}$ and $\omega_{y\_2}$ are updated weights in the y direction; $\mu_1$ is the step factor.

Therefore, the vibration displacement signal $\hat{y}$ in the y direction is obtained. As shown in FIG. 4, a displacement difference between the specified value 0 and the vibration displacement signal $\hat{y}$ is input to the fourth PID controller 54, and the fourth PID controller 54 makes adjustment to obtain the vibration compensation force $F_{yh}$.

A sum of the force $F_x$ in the x direction output by the first PID controller 11 and the vibration compensation force $F_{xh}$ in the x direction output by the vibration force compensation module 5 and a sum of the force $F_y$ in the y direction output by the second PID controller 12 and the vibration compensation force $F_{yh}$ in the y direction output by the vibration force compensation module 5 are input to the force/current conversion module 13 to obtain a specified quadrature axis current value $i^*_{Bq}$ and a specified direct axis current value $i^*_{Bd}$ of the suspension winding.

Differences between the obtained a specified quadrature axis current value $i^*_{Bq}$, and a specified direct axis current value $i^*_{Bd}$ and an actual quadrature axis current value $i_{Bq}$, an actual direct axis current value $i_{Bd}$ of the suspension winding are obtained respectively. The current sensor collects currents $i_{1A}$ and $i_{1C}$ of the two-phase suspension winding of the bearingless permanent magnet synchronous motor 3 and inputs the collected currents to the fourth coordinate transformation module 91. The fourth coordinate transformation module 91 is configured for performing Clarke transform and Park transform. The fourth coordinate transformation module 91 processes $i_{1A}$ and $i_{1C}$ to obtain the actual quadrature axis current $i_{Bq}$ and the actual direct axis current $i_{Bd}$ of the suspension winding. The difference between $i^*_{Bq}$ and $i_{Bq}$ is input to the fifth PI controller 15 to obtain a quadrature axis control voltage $u_{Bq}$ of the suspension winding. The difference between $i^*_{Bd}$ and $i_{Bd}$ is input to the fourth PI controller 14 to obtain a direct axis control voltage $u_{Bd}$ of the suspension winding.

A rotor electrical angle $\theta_e$, the actual quadrature axis current value $i_{Bq}$ of the suspension winding, and the actual direct axis current value $i_{Bd}$ of the suspension winding are input to the dead-time vibration compensation module 6 to obtain compensation voltages $u_{Bqh}$ and $u_{Bdh}$. The angle calculation module 17 processes the pulse signal, collected by the coder 27, of the bearingless permanent magnet synchronous motor 3 to obtain the rotor electrical angle $\theta_e$, which is calculated as follows:

$$\theta_e(k) = P_M \theta_m(k) \quad (7)$$

wherein $\theta_m(k)$ is the rotor mechanical angle at the moment k according to the formula (2) and $P_M$ is the number of pole-pairs of the torque winding.

Figure 5:
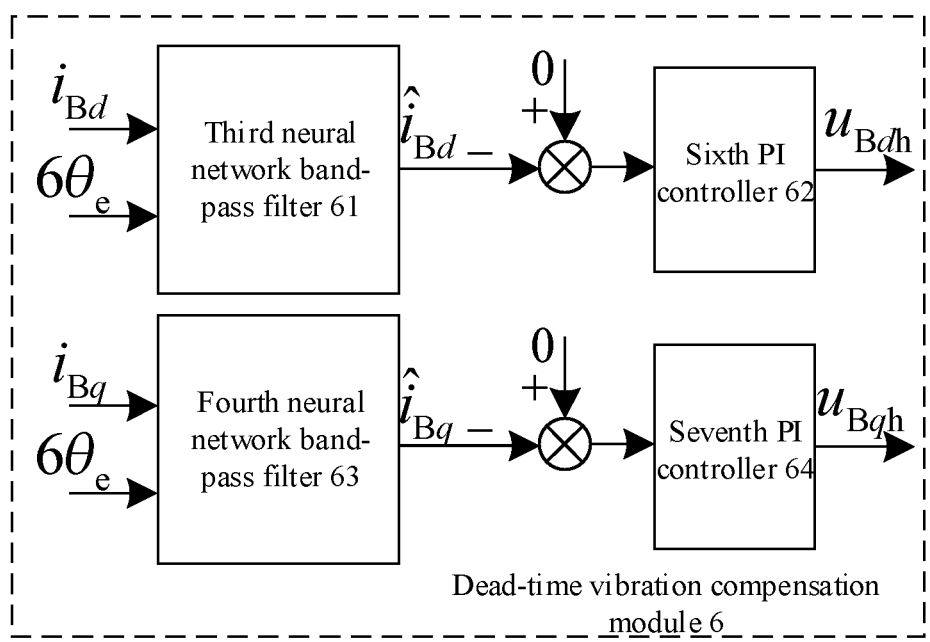
FIG. 5 is a schematic block diagram of a dead-time vibration compensation module 6 in direct and quadrature axis directions in FIG. 3.
Figure 8:
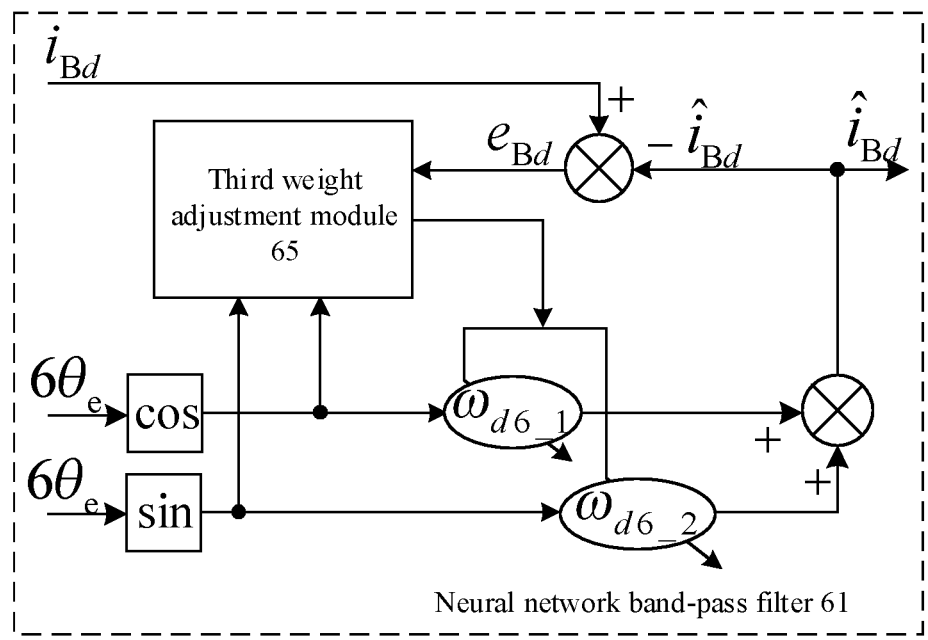
FIG. 8 is a schematic block diagram of the internal structure of a third neural network band-pass filter 61 in FIG. 6.

The obtained rotor electrical angle $\theta_e$ and the actual quadrature axis current value $i_{Bq}$ and the actual direct axis current value $i_{Bd}$ are input to the dead-time vibration compensation module 6. The dead-time vibration compensation module 6 comprises a third neural network band-pass filter 61 in the direct axis direction, a fourth neural network band-pass filter 63 in the quadrature axis direction, a sixth PI controller 62, and a seventh PI controller 64. In the dead-time vibration compensation module 6, compensations in the direct axis direction and the quadrature axis direction are shown in FIG. 5. The current $i_{Bd}$ in the direct axis direction and 6 times of the rotor electrical angle $\theta_e$ are input to the third neural network band-pass filter 61 in the direct axis direction to obtain a harmonic current signal $\hat{i}_{Bd}$ in the direct axis direction. FIG. 8 is a schematic diagram of the internal structure of the third neural network band-pass filter 61 in the direct axis direction, which includes a third weight adjustment module 65. In FIG. 8, a difference between the current $i_{Bd}$ in the direct axis direction and the harmonic current signal $\hat{i}_{Bd}$ output by the third neural network band-pass filter 61 serves as an error signal $e_{Bd}$; the error signal $e_{Bd}$ and sine and cosine values of 6 times of the rotor electrical angle $\theta_e$ are input to the third weight adjustment module 65 to obtain updated weights $\omega_{d6\_1}$ and $\omega_{d6\_2}$ in the direct axis direction. The harmonic current $\hat{i}_{Bd}$ output by the third neural network band-pass filter 61 at the moment k is calculated by the following formula:

$$\hat{i}_{Bd}(k) = \omega_{d6\_1}(k) \cdot \cos 6\theta_e(k) + \omega_{d6\_2}(k) \cdot \sin 6\theta_e(k) \quad (8).$$

The weights $\omega_{d6\_1}$ and $\omega_{d6\_2}$ are calculated by the following formulas:

$$\begin{cases} \omega_{d6\_1}(k+1) = \omega_{d6\_1}(k) + 2\mu_2 e_{Bd} \cos 6\theta_e \\ \omega_{d6\_2}(k+1) = \omega_{d6\_2}(k) + 2\mu_2 e_{Bd} \sin 6\theta_e \end{cases} \quad (9)$$

wherein $e_{Bd}$ is a component in the direct axis direction after harmonics are filtered out; $\omega_{d6\_1}$ and $\omega_{d6\_2}$ are updated sixth-harmonic weights in the direct axis direction; $\mu_2$ is a step factor.

Therefore, the harmonic current signal $\hat{i}_{Bd}$ in the direct axis direction is obtained. As shown in FIG. 5, a difference between the specified value 0 and the harmonic current signal $\hat{i}_{Bd}$ is input to the sixth PI controller 62, and the sixth PI controller 62 makes adjustment to obtain the direct axis compensation voltage $u_{Bdh}$.

Figure 9:
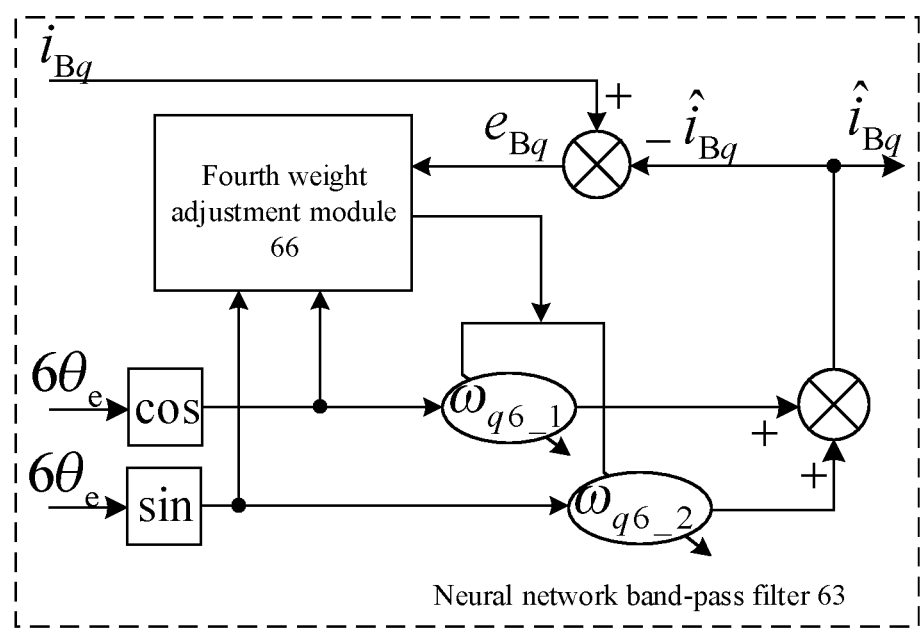
FIG. 9 is a schematic block diagram of the internal structure of a fourth neural network band-pass filter 63 in FIG. 7.

The fourth neural network band-pass filter 63 in the quadrature axis direction is identical to the third neural network band-pass filter 61 in structure. Likewise, the current $i_{Bq}$ in the quadrature axis direction and 6 times of the rotor electrical angle $\theta_e$ are input to the fourth neural network band-pass filter 63 in the quadrature axis direction to obtain a harmonic current signal $\hat{i}_{Bq}$ in the direct axis direction. FIG. 9 is a schematic diagram of the internal structure of the fourth neural network band-pass filter 63 in the quadrature axis direction, which includes a fourth weight adjustment module 66. In FIG. 9, a difference between the current $i_{Bq}$ in the quadrature axis direction and the harmonic current signal $\hat{i}_{Bq}$ output by the fourth neural network band-pass filter 63 serves as a current error signal $e_{Bq}$; the current error signal $e_{Bq}$ and the sine and cosine values of 6 times of the rotor electrical angle $\theta_e$ are input to the fourth weight adjustment module 66 to obtain updated weights $\omega_{q6\_1}$ and $\omega_{q6\_2}$ in the direct axis direction. The harmonic current $\hat{i}_{Bq}$ output by the fourth neural network band-pass filter 63 at the moment k is calculated by the following formula:

$$\hat{i}_{Bq}(k) = \omega_{q6\_1}(k) \cdot \cos 6\theta_e(k) + \omega_{q6\_2}(k) \cdot \sin 6\theta_e(k) \quad (10).$$

The weights $\omega_{d6\_1}$ and $\omega_{d6\_2}$ are calculated by the following formulas:

$$\begin{cases} \omega_{q6\_1}(k+1) = \omega_{q6\_1}(k) + 2\mu_2 e_{Bq} \cos 6\theta_e \\ \omega_{q6\_2}(k+1) = \omega_{q6\_2}(k) + 2\mu_2 e_{Bq} \sin 6\theta_e \end{cases} \quad (11)$$

wherein $e_{Bq}$ is a component in the quadrature axis direction after harmonics are filtered out; $\omega_{q6\_1}$ and $\omega_{q6\_2}$ are updated sixth-harmonic weights in the quadrature axis direction; $\mu_2$ is the step factor.

Therefore, the harmonic current signal $\hat{i}_{Bq}$ in the direct axis direction is obtained. As shown in FIG. 5, a difference between the specified value 0 and the harmonic current signal $\hat{i}_{Bq}$ is input to the seventh PI controller 64, and the seventh PI controller 64 makes adjustment to obtain the quadrature axis compensation voltage $u_{Bqh}$.

A sum of the direct axis voltage $u_{Bd}$ output by the fourth PI controller 14 and the direct axis compensation voltage $u_{Bdh}$ output by the dead-time vibration compensation module serves as a direct axis command voltage $u^*_{Bd}$. A sum of the quadrature axis voltage $u_{Bq}$ output by the fifth PI controller 15 and the quadrature axis compensation voltage $u_{Bqh}$ output by the dead-time vibration compensation module serves as a quadrature axis command voltage $u^*_{Bq}$. The obtained $u^*_{Bd}$ and $u^*_{Bq}$ are input to the third coordinate transformation module 16. The third coordinate transformation module 16 is configured for performing inverse Park transform. The third coordinate transformation module 16 processes $u^*_{Bd}$ and $u^*_{Bq}$ to obtain voltages $u_{B\alpha}$ and $u_{B\beta}$ of the suspension winding in the stationary reference frame.

The voltages $u_{B\alpha}$ and $u_{B\beta}$ of the suspension winding are input to the second SVPWM inverter 90. An output of the second SVPWM inverter 90 is connected to the input of the bearingless permanent magnet synchronous motor 3. The second SVPWM inverter 90 obtains three-phase input voltages $u_{1A}$, $u_{1B}$, $u_{1C}$ of the bearingless permanent magnet synchronous motor 3.

Figure 10:
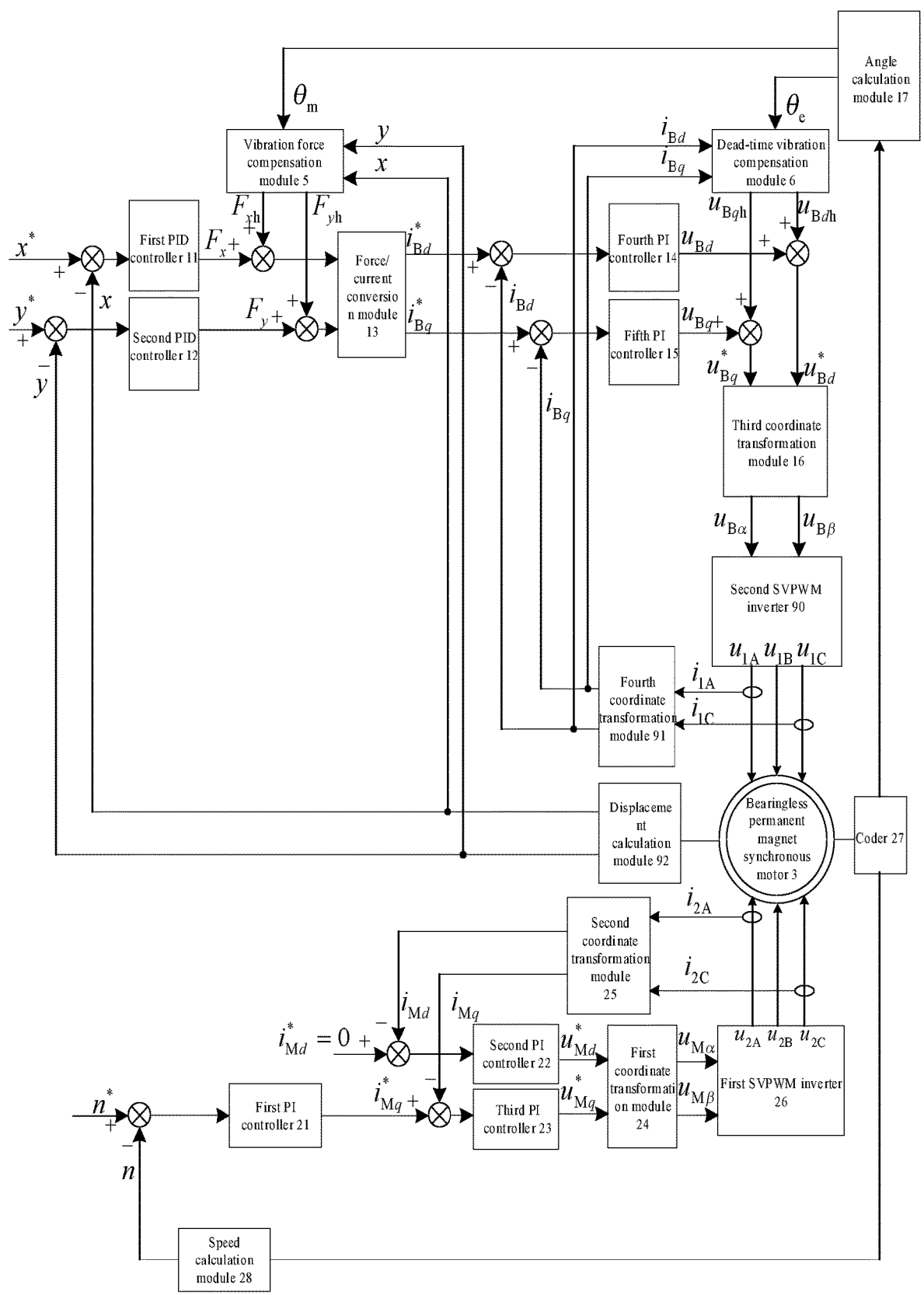
FIG. 10 is a schematic block diagram of the overall structure of a motor vibration compensation controller according to the present invention.

FIG. 10 is a schematic block diagram of the overall structure of the motor vibration compensation controller according to the present invention. Closed-loop control of speed and vibration compensation control are realized through design of the displacement controller 1, the rotating speed controller 2, and the modules therein as well as parameter adjustment of closed-loop regulators for speed and position. The rotating speed controller 2 performs speed regulation and control by using a commonly used vector control method with a direct axis command current of 0. The displacement controller 1 completes vector control through displacement adjustment, so that the rotor of the bearingless permanent magnet synchronous motor 3 maintains stable operation. The vibration force compensation module 5 performs compensation control on the eccentricity vibration signal in the displacement signals. Meanwhile, the dead-time vibration compensation control module 6 compensates for high-order harmonic signals in the current caused by the dead-time effect, thereby achieving more precise vibration compensation control.

The present invention can be implemented based on the above descriptions. Other changes and modifications made by persons skilled in the art without departing from the spirit and protection scope of the present invention still fall within the protection scope of the present invention.

What is claimed is:

1. A vibration compensation controller with neural network band-pass filters for a bearingless permanent magnet synchronous motor, comprising a displacement controller and a rotating speed controller, wherein the displacement controller comprises a vibration force compensation control module and a dead-time vibration compensation module;

the vibration force compensation control module receives, as input, actual displacements x, y in x and y directions and a rotor mechanical angle $\theta_m$ and outputs corresponding vibration compensation forces $F_{xh}$ and $F_{yh}$, the vibration force compensation control module comprises a first neural network band-pass filter, a second neural network band-pass filter, a third proportional-integral-derivative (PID) controller, and a fourth PID controller, wherein the first neural network band-pass filter receives, as input, the actual displacement x in the x direction and the rotor mechanical angle $\theta_m$ and outputs a vibration displacement $\hat{x}$, a difference between a specified value 0 and the vibration displacement $\hat{x}$ is input to the third PID controller, and the third PID controller outputs the vibration compensation force $F_{xh}$, the second neural network band-pass filter receives the actual displacement y in the y direction and the rotor mechanical angle $\theta_m$ and outputs a vibration displacement $\hat{y}$, a difference between the specified value 0 and the vibration displacement $\hat{y}$ is input to the fourth PID controller, and the fourth PID controller outputs the vibration compensation force $F_{yh}$, a sum of the vibration compensation force $F_{xh}$ and a specified force value $F_x$ of a suspension winding in the x direction is input to a force/current conversion module, a sum of the vibration compensation force $F_{yh}$ and a specified force value $F_y$ of the suspension winding in the y direction is input to the force/current conversion module, and the current conversion module obtains a specified quadrature axis current value $i^*_{Bq}$ and a specified direct axis current value $i^*_{Bd}$;

the dead-time vibration compensation module receives, as input, a rotor electrical angle $\theta_e$, and an actual quadrature axis current $i_{Bq}$, and an actual direct axis currents $i_{Bd}$ and outputs a quadrature axis compensation voltages $u_{Bqh}$ and a direct axis compensation voltages $u_{Bdh}$, the dead-time vibration compensation module comprises a third neural network band-pass filter in a direct axis direction, a fourth neural network band-pass filter in a quadrature axis direction, a sixth proportional-integral (PI) controller, and a seventh PI controller, wherein the third neural network band-pass filter receives, as input, the actual direct axis current $i_{Bd}$ in the direct axis direction and 6 times of the rotor electrical angle $\theta_e$ and obtains a harmonic current $\hat{i}_{Bd}$ in the direct axis direction, a difference between the specified value 0 and the harmonic current $\hat{i}_{Bd}$ is input to the sixth PI controller, and the sixth PI controller obtains the direct axis compensation voltage $u_{Bdh}$, a sum of a control voltage $u_{Bd}$ in the direct axis direction and the direct axis compensation voltage $u_{Bdh}$ serves as a direct axis command voltage $u^*_{Bd}$, the fourth neural network band-pass filter receives actual quadrature axis current $i_{Bq}$ in the quadrature axis direction and 6 times of the rotor electrical angle $\theta_e$, and obtains a harmonic current $\hat{i}_{Bq}$ in the quadrature axis direction, a difference between the specified value 0 and the harmonic current $\hat{i}_{Bq}$ is input to the seventh PI controller, and the seventh PI controller obtains the quadrature axis compensation voltage $u_{Bqh}$, and a sum of a control voltage $u_{Bq}$ in the quadrature axis direction and the quadrature axis compensation voltage $u_{Bqh}$ serves as a quadrature axis command voltage $u^*_{Bq}$.

2. The vibration compensation controller with the neural network band-pass filters for the bearingless permanent magnet synchronous motor according to claim 1, wherein
the first neural network band-pass filter in the x direction comprises a first weight adjustment module,
a difference between the actual displacement x and the vibration displacement $\hat{x}$ serves as an error $e_x$,
the error $e_x$ and sine and cosine values of the rotor mechanical angle $\theta_m$ are input to the first weight adjustment module to obtain updated weights $\omega_{x\_1}$ and $\omega_{x\_2}$ in the x direction, and
the second neural network band-pass filter is identical to the first neural network band-pass filter.

3. The vibration compensation controller with the neural network band-pass filters for the bearingless permanent magnet synchronous motor according to claim 2, wherein
the vibration displacement at a moment k is $\hat{x}(k)=\omega_{x\_1}(k)\cdot\cos\theta_m(k)+\omega_{x\_2}(k)\sin\theta_m(k)$, wherein $\omega_{x\_1}(k+1)=\omega_{x\_1}(k)+2\mu_1 e_x \cos\theta_m$, $\omega_{x\_2}(k+1)=\omega_{x\_2}(k)+2\mu_1 e_x \sin\theta_m$, $e_x$ is a component in the x direction after harmonics are filtered out, $\omega_{x\_1}$ and $\omega_{x\_2}$ are the updated weights in the x direction, and $\mu_1$ is a step factor.

4. The vibration compensation controller with the neural network band-pass filters for the bearingless permanent magnet synchronous motor according to claim 1, wherein
the third neural network band-pass filter comprises a third weight adjustment module,
a difference between the current $i_{Bd}$ in the direct axis direction and the harmonic current signal $\hat{i}_{Bd}$ output by the third neural network band-pass filter serves as a current error $e_{Bd}$;
the current error $e_{Bd}$ and sine and cosine values of 6 times of the rotor electrical angle $\theta_e$ are input to the third weight adjustment module to obtain updated weights $\omega_{d6\_1}$ and $\omega_{d6\_2}$ in the direct axis direction,
the third neural network band-pass filter outputs the harmonic current $\hat{i}_{Bd}$, and
the fourth neural network band-pass filter is identical to the third neural network band-pass filter in structure and outputs the harmonic current $\hat{i}_{Bq}$.

5. The vibration compensation controller with the neural network band-pass filters for the bearingless permanent magnet synchronous motor according to claim 4, wherein
the harmonic current at the moment k is $\hat{i}_{Bd}(k)=\omega_{d6\_1}(k)\cdot\cos 6\theta_e(k)+\omega_{d6\_2}(k)\cdot\sin 6\theta_e(k)$, wherein $\omega_{d6\_1}(k+1)=\omega_{d6\_1}(k)+2\mu_2 e_{Bd}\cos 6\theta_e$, $\omega_{d6\_2}(k+1)=\omega_{d6\_2}(k)+2\mu_2 e_{Bd}\sin 6\theta_e$, $e_{Bd}$ is a component in the direct axis direction after harmonics are filtered out, $\omega_{d6\_1}$ and $\omega_{d6\_2}$ are the updated sixth-harmonic weights in the direct axis direction, and, $\mu_2$ is a step factor.

6. The vibration compensation controller with the neural network band-pass filters for the bearingless permanent magnet synchronous motor according to claim 1, wherein
a difference between the actual displacement x in the x direction and a specified value x* serves as a displacement error, and the displacement error is input to a first PID controller,
the first PID controller makes adjustment to obtain the specified force value $F_x$ of the suspension winding in the x direction,
a difference between the actual displacement y in the y direction and a specified value y* serves as a displacement error, and the displacement error is input to a second PID controller, and
the second PID controller makes adjustment to obtain the specified force value $F_y$ of the suspension winding in the y direction.

7. The vibration compensation controller with the neural network band-pass filters for the bearingless permanent magnet synchronous motor according to claim 1, wherein
currents $i_{1A}$ and $i_{1C}$ of the two-phase suspension winding of the bearingless permanent magnet synchronous motor are collected and input to a fourth coordinate transformation module, and the fourth coordinate transformation module obtains the actual quadrature axis current $i_{Bq}$ and the actual direct axis current $i_{Bd}$ of the suspension winding;
differences between the specified quadrature axis current value $i^*_{Bq}$, the specified direct axis current value $i^*_{Bd}$ and the actual quadrature axis currents $i_{Bq}$, and the actual direct axis $i_{Bd}$ are obtained and input to a fourth PI controller and a fifth PI controller, respectively,
the fourth PI controller outputs the control voltage $u_{Bd}$ in the direct axis direction, and
the fifth PI controller outputs the control voltage $u_{Bq}$ in the quadrature axis direction.

8. The vibration compensation controller with the neural network band-pass filters for the bearingless permanent magnet synchronous motor according to claim 1, wherein
the quadrature axis command voltage $u^*_{Bd}$ and the direct axis command voltage $u^*_{Bq}$ are input to a third coordinate transformation module,
the third coordinate transformation module outputs voltages $u_{B\alpha}$, and $u_{B\beta}$ of the suspension winding in a stationary reference frame,
the voltages $u_{B\alpha}$, and $u_{B\beta}$ of the suspension winding are input to a second space vector pulse width modulation inverter, and
the second SVPWM inverter obtains three-phase input voltages $u_{1A}$, $u_{1B}$, $u_{1C}$ of the bearingless permanent magnet synchronous motor.

9. The vibration compensation controller with the neural network band-pass filters for the bearingless permanent magnet synchronous motor according to claim 1, wherein
a coder is adopted to collect pulse signals from the bearingless permanent magnet synchronous motor, and an angle calculation module is used to obtain the rotor mechanical angle at the moment $$k\ \theta_m(k) = \theta_m(k-1) + \frac{60\Delta P}{9.55 L_e},$$

wherein $\Delta P$ is an accumulation result of pulses output by the coder.

10. The vibration compensation controller with the neural network band-pass filters for the bearingless permanent magnet synchronous motor according to claim 9, wherein
the rotor electrical angle at the moment k is $\theta_e(k)=P_M\theta_m(k)$, wherein $\theta_m(k)$ is the rotor mechanical angle at the moment k and $P_M$ is a number of pole-pairs of a torque winding.

* * * * *